(12) United States Patent
Tzeng (10) Patent No.: US 12,192,645 B2
(45) Date of Patent: Jan. 7, 2025

(54) METHOD AND CIRCUITRY FOR EXPOSURE COMPENSATION APPLIED TO HIGH DYNAMIC RANGE VIDEO

(71) Applicant: REALTEK SEMICONDUCTOR CORP., Hsinchu (TW)

(72) Inventor: Yu-Heng Tzeng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 95 days.

(21) Appl. No.: 18/098,175

(22) Filed: Jan. 18, 2023

(65) Prior Publication Data

US 2023/0239577 A1 Jul. 27, 2023

(30) Foreign Application Priority Data

Jan. 26, 2022 (TW) ................... 111103241

(51) Int. Cl.
*H04N 23/73* (2023.01)
*G06V 10/25* (2022.01)
(Continued)

(52) U.S. Cl.
CPC ............. *H04N 23/73* (2023.01); *G06V 10/25* (2022.01); *G06V 10/507* (2022.01); *G06V 10/60* (2022.01);
(Continued)

(58) Field of Classification Search
CPC .... H04N 23/73; H04N 23/741; H04N 23/743; H04N 23/70; H04N 23/71; H04N 23/76; H04N 23/80; H04N 25/531; H04N 25/57; H04N 25/571; H04N 25/573; H04N 25/58; H04N 25/581; H04N 25/583; H04N 25/587; G06V 10/25; G06V 10/507; G06V 10/60; G06V 10/751; G06T 5/94; G06T 2207/10016; G06T 2207/10144;
(Continued)

(56) References Cited

U.S. PATENT DOCUMENTS 8,228,392 B2 7/2012 Siddiqui
2006/0250515 A1* 11/2006 Koseki ................... H04N 23/70
348/E5.034

(Continued)

FOREIGN PATENT DOCUMENTS

CN 101902581 A 12/2010
WO WO 2017172103 A1 10/2017

*Primary Examiner* — Albert H Cutler
(74) *Attorney, Agent, or Firm* — Li & Cai Intellectual Property (USA) Office (57) ABSTRACT

A method and a circuitry for exposure compensation applied to a high dynamic range video are provided. The circuitry is adapted to an image-acquisition device. In the method, when a video is received, the pixel values for each of the sequential frames can be obtained. Next, an exposure value ratio between two adjacent frames is obtained. A processor exposure value ratio of an image signal processor can be regarded as an initial exposure value ratio. A fixed adjustment ratio is used to control the image signal processor and an image sensor of the image-acquirement device so as to calculate an exposure value ratio for each of the frames. The exposure value ratio is referred to for performing the high dynamic range compensation for the frames so as to output an HDR video.

15 Claims, 9 Drawing Sheets

(51) Int. Cl.
    *G06V 10/50*         (2022.01)
    *G06V 10/60*         (2022.01)
    *G06V 10/75*         (2022.01)
    *H04N 23/741*       (2023.01)
    *H04N 25/589*       (2023.01)

(52) U.S. Cl.
    CPC ......... *G06V 10/751* (2022.01); *H04N 23/741* (2023.01); *H04N 25/589* (2023.01)

(58) Field of Classification Search
    CPC . G06T 2207/20208; G06T 2207/20221; G06T 5/50
    See application file for complete search history.

(56) References Cited

U.S. PATENT DOCUMENTS

| | | | |
|---|---|---|---|
| 2011/0317028 A1* | 12/2011 | Shinmei | H04N 23/741 348/226.1 |
| 2015/0172528 A1* | 6/2015 | Maeyama | H04N 25/59 348/362 |
| 2021/0374922 A1* | 12/2021 | Qian | H04N 23/76 |
| 2022/0116530 A1* | 4/2022 | Zhou | G06T 7/12 |

* cited by examiner

METHOD AND CIRCUITRY FOR EXPOSURE COMPENSATION APPLIED TO HIGH DYNAMIC RANGE VIDEO

CROSS-REFERENCE TO RELATED PATENT APPLICATION

This application claims the benefit of priority to Taiwan Patent Application No. 111103241, filed on Jan. 26, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a technology of exposure compensation applied to a high dynamic range (HDR) video, and more particularly to a method and a circuitry for performing exposure compensation for the HDR video according to an exposure value ratio between a pair of pixels in an HDR frame of a video rather than using queue as in the conventional technology.

BACKGROUND OF THE DISCLOSURE

A high dynamic range (HDR) video utilizes a high dynamic range technology to be applied to a video that is composed of a series of continuous images. The high dynamic range technology supports an image sensor that is configured to output the HDR video having multiple frames with different exposure values. Specifically, the image sensor outputs a series of images with different exposure values and an image signal processor (ISP) combines the images into one frame so as to obtain the video including sequential frames that has a greater dynamic range for avoiding being overexposed and images that are too dark.

Figure 1:
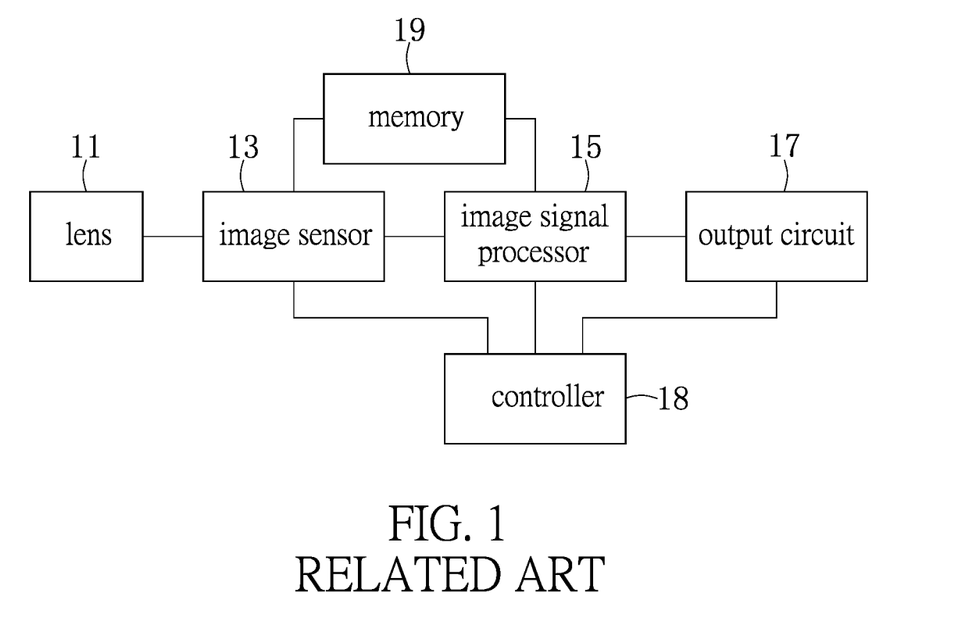
FIG. 1 is a circuit block diagram of a conventional image-acquisition device.

Main circuits of a conventional image-acquisition device such as a camera can be referred to as in a block diagram shown in FIG. 1. A controller 18 in the image-acquisition device is used to control operations of the main circuits. When the image-acquisition device is activated, the relevant circuits and mechanism are driven to capture a series of images through a lens 11. An image sensor 13 is configured to receive image signals, and a memory 19 is used to store the image signals. An image signal processor 15 then processes the image signals through processes such as image restoration, rendering and compression, and outputs an image via an output circuit 17. The above-mentioned high dynamic range technology uses the image sensor 13 and the image signal processor 15 to respectively perform image exposure and composition. The controller 18 controls the image sensor 13 to generate bright and dark frames expected by the image signal processor 15. Most image sensors require multiple frames to render a new exposure value. In the conventional technology, according to the number of frames that are taken during the effect of expose by the image sensor, the processor uses queue to delay parameters such that the exposure parameters and parameters of the image signal processor simultaneously take effect.

Figure 2:
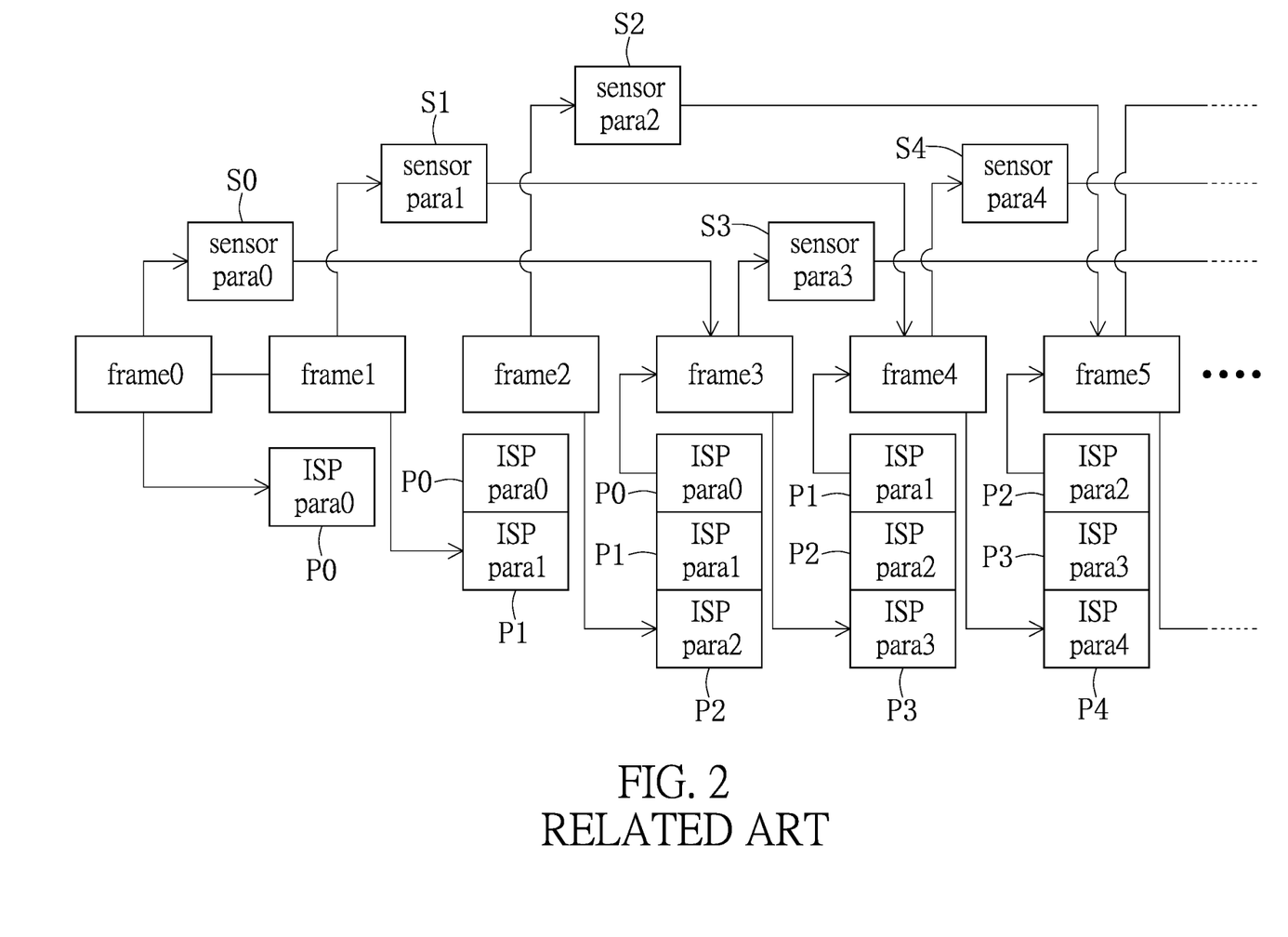
FIG. 2 is a schematic diagram depicting a queue of an image signal processor being used to control parameters of an HDR video according to a conventional technology.

FIG. 2 is a schematic diagram depicting the usage of a queue in an image signal processor for controlling values of parameters for generating an HDR video according to the conventional technology. An input video includes a series of sequential frames that are exemplarily represented by frame 0, frame 1, frame 2, frame 3, frame 4, and frame 5. When producing the HDR video, the image sensor requires multiple frames to render a new exposure value. The parameters of the image sensor processing the sequential frames take effect after delaying two frames. An arrow shown on the top portion of FIG. 2 indicates that the image parameters of each frame will take effect after two frames, such as the sensor parameters 0 (S0) that take effect at a third frame after two frames. Similarly, all of the sensor parameters 1 (S1), the sensor parameters 2 (S2), the sensor parameters 3 (S3), and the sensor parameters 4 (S4) will take effect at the third frame after delaying two frames.

In the abovementioned case, a circuit system requires three-layer stacks of image signal processor parameters to accomplish synchronization between the image sensor and the image signal processor. A queue can be used to achieve parameter delay for the image signal processor according to the number of frames (e.g., two frames) that are required by the image sensor to expose for effectiveness. Accordingly, the exposure parameters and the image signal processor parameters can synchronously take effect. The bottom portion of FIG. 2 shows the image signal processor parameters including processor parameters 0 (P0) of 0th frame image queue, processor parameters 1 (P1) of 1st frame image queue, and processor parameters 2 (P2) of 2nd frame image queue. When the second frame is generated, the three-layer stacks (e.g., P0, P1 and P2) of image signal processor parameters are formed in a memory. After that, the parameters are outputted to the image signal processor frame by frame. When the processor parameters 0 (P0) are outputted from the queue, the sensor parameters 0 (S0) synchronously take effect. As shown in the diagram, the processor parameters 1 (P1), the processor parameters 2 (P2), and the processor parameters 3 (P3) and the processor parameters 4 (P4) form a parameter stack in the memory when a fourth frame is rendered. Similarly, the processor parameters 2 (P2), the processor parameters 3 (P3) and the processor parameters 4 (P4) form another parameter stack in the memory when a fifth frame is rendered. In the memory, the image data with different exposure values are queued. The image data are then outputted frame by frame to the image signal processor, and the image signal processor renders new images that have new exposure values. A high dynamic range video is therefore generated. However, the conventional technology has following deficiencies.

Figure 3A:
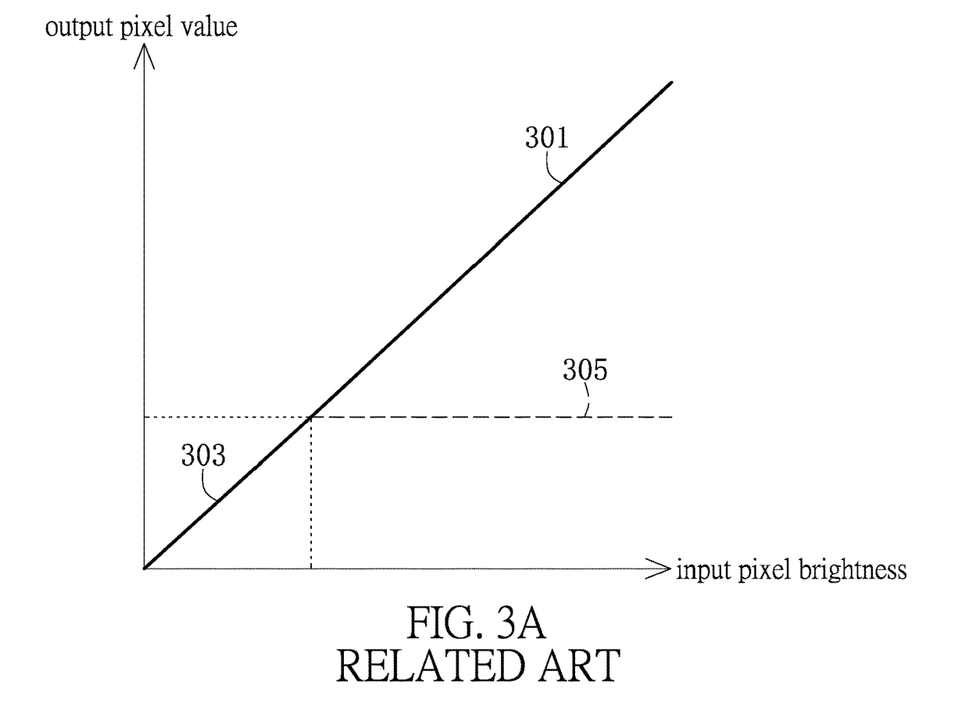
FIG. 3A and FIG. 3B are curve diagrams depicting a short frame being used to compensate a long frame overexposure region when rendering the HDR video according to a conventional technology.
Figure 3B:
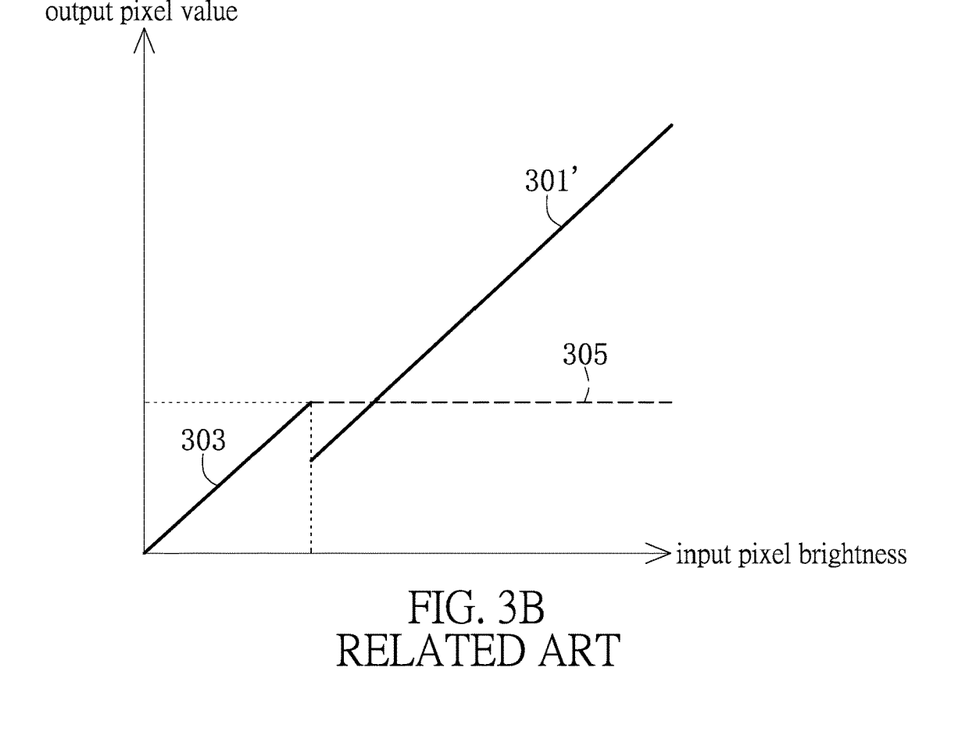

Conventionally, for rendering the high dynamic range video, a short exposure frame is used to compensate an overexposure region of a long exposure frame. FIG. 3A is a diagram depicting a relation between brightness of pixels of an input image (i.e., the horizontal axis) and pixel values of an output image (i.e., the vertical axis). The diagram indicates that a short exposure frame 301 replaces overexposure data of a long exposure frame 303. Namely, an extension section 305 of the long exposure frame 303 is replaced by the short exposure frame 301. In the process of exposure compensation, if exposure frames in the image sensor are not synchronous with the image signal processor parameters, an intersection region between a solid line and a broken line may be discontinuous. For example, such as in FIG. 3B, a short exposure frame 301' and the long exposure frame 303 are discontinuous. Therefore, the conventional method is incapable of being aware of the discontinuity with the queue that is used to implement parameter delay and compensating the discontinuity in real time. It should be noted that when the condition changes, the discontinuity occurring in the intersection region between the short exposure frame 301' and the long exposure frame 303 may result in problems such as abnormal composition of the intersection region, and flickering phenomenon on the screen.

SUMMARY OF THE DISCLOSURE

In the conventional technology that implements a high dynamic range (HDR) video, an image sensor uses a queue to achieve synchronization of exposed frames in an image signal processor. However, the image signal processor may suffer the problems of abnormal composition and flickering phenomenon on the screen since the image signal processor cannot guarantee the number of effective frames. In view of the drawbacks of the conventional technology, the present disclosure provides the method of exposure compensation applied to a high dynamic range video and a circuit that perform instant exposed frame synchronization upon the continuous images without relying on a control procedure of a queue so that the abnormal composition and the flickering phenomenon when rendering the high dynamic range video can be effectively avoided.

According to one embodiment of the method for exposure compensation applied to a high dynamic range video, the method is adapted to an image-acquisition device. When the image-acquisition device receives a video, pixel values of each of sequential frames retrieved from the video are obtained. An exposure value ratio between two of the sequential frames can be obtained, an initial exposure value ratio is preset, and a processor exposure value ratio of the image signal processor is adopted. A fixed adjustment ratio is then used to control the image signal processor and the image sensor to obtain an exposure value ratio of each of the frames, and the exposure value ratio is used to conduct compensation so as to output a high dynamic range video having sequential frames with high dynamic range compensation.

Preferably, in the method for exposure compensation applied to a high dynamic range video, in a beginning of the method, a brightness range threshold can be set for excluding overly-dark and overly-bright pixels, and a light-dark ratio threshold can be set to exclude potential moving regions in the video.

Further, when the pixel values of two sequential frames are retrieved from the video, a ratio range and an appropriate brightness range are set between the two sequential frames according to the processor exposure value ratio and the brightness range threshold. A valid pixel pair between two sequential frames is selected within a reasonable ratio after excluding the overexposed or overly-dark pixels. An exposure compensation is performed upon the HDR video with the valid pixel pair between two sequential frames.

Preferably, when the HDR video compensation is performed, an instant exposure value ratio is obtained by comparing sums of the row pixel values of the two frames. The instant exposure value ratio equals to a previous row exposure value ratio plus an adjustment value for each of the rows. When the exposure value ratio of each row of each of the frames is calculated, a threshold for adjusting the exposure value ratio is used to converge the exposure value ratio for each of the frames.

Furthermore, starting from the processor exposure value ratio initially, the adjustment value of each of the rows and the fixed adjustment ratio are used to converge the exposure value ratio. A removable region with a height in each of the frames is removed after the convergence, and an output image region with another height is taken.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure is related to a method for exposure compensation applied to a high dynamic range (HDR) video and a circuit. When an HDR video is produced, an exposure compensation process is performed according to an exposure value ratio that is detected in real time. In the exposure compensation process, an image sensor and an image signal processor do not rely on a queue to conduct parameter synchronization for avoiding brightness discontinuity and abnormal composition that occur in an intersection region between frames.

Continuous images are converted to an HDR video through a high dynamic range process. The high dynamic range process uses at least two frames, in which each of the two frames is an image with a height "m" and a width "n", to render an HDR image. The pixel value (P) of each pixels of the image can be expressed by $P_{i,j,k}$ based on a weight, a height, and a number of exposed frames, in which "i" indicates a position at an x-direction of the image, "j" indicates a position at a y-direction of the image, and "k" indicates the number of the exposed frames. For implementing the HDR video, two frames including a long exposure frame and a short exposure frame are incorporated. With an image captured by a static camera as an example, in addition to a moving region of the image, the remaining region is static. Accordingly, the pixel values of a previous frame and a next frame have a relationship of $P_{i,j,1}=P_{i,j,2}*R$, in which "$P_{i,j,1}$" indicates a pixel value of a first frame, "$P_{i,j,2}$" indicates a pixel value of a second frame, and "R" indicates an exposure value ratio between the first frame and the second frame. Further, according to one embodiment of the present disclosure, the exposure compensation process is performed in rows. For a first row of the image (i=1 to n), the exposure value ratio R can be obtained by comparing the sums of pixel values of rows of the two exposed frames. The exposure value ratio R can be calculated by equation 1.

$$R = \frac{\sum_{i=1}^{n} P_{i,1,1}}{\sum_{j=1}^{n} P_{i,1,2}}. \quad \text{Equation 1}$$

However, using the two frame exposure values to implement high dynamic range would cause two problems. One of which is that the content in a long exposure frame is different from the content in a short exposure frame due to the pixel pair in the previous frame and the next frame changes in a moving region. Therefore, the above-mentioned method does not apply to the video having the moving region. The other one of which is that an error may occur since the pixel values of the overly-dark or overly-bright region are too small and too close to an overexposure region. Accordingly, the method for exposure compensation applied to the HDR video is provided for eliminating the abovementioned problems.

A pair of pixel values formed by the previous and next frames can be expressed by "{$P_{i,j,1}$, $P_{i,j,2}$}." A processor exposure value ratio $R_{ISP}$ is configured to be inputted to the image signal processor in advance. Further, in a beginning of the method, a brightness range threshold is set for excluding overly-dark and overly-bright pixels, and a light-dark ratio threshold is set for excluding one or more potential moving regions from the video. An exemplary example of selecting a pixel range being used to render the HDR video is as follows.

A first frame ($P_{i,j,1}$) is configured to be a bright frame. An appropriate brightness range without overexposed region and/or overly-dark region is chosen according to a brightness distribution. For example, a brightness range [1024, 3072] is chosen from a 12-bit image.

A second frame ($P_{i,j,2}$) is configured to be a dark frame. A reasonable range [$P_{i,j,1}/(R_{ISP}+\varepsilon)$, $P_{i,j,1}/(R_{ISP}-\varepsilon)$] of the second frame ($P_{i,j,2}$) can be obtained according to the pixel values of the first frame ($P_{i,j,1}$), the exposure value ratio ($R_{ISP}$) of the image signal processor, and a potential error ratio ($\varepsilon$) Next, in the previous frame and the next frame, only the pixel pair in the bright frame (i.e., first frame $P_{i,j,1}$) and the dark frame (i.e., second frame $P_{i,j,2}$) that are within the reasonable range are taken. The reasonable range indicates a range where the overly-bright and/or overly-dark pixels are excluded according to a brightness range threshold. Further, a light-dark ratio threshold can also be used for excluding one or more potential moving regions from the video.

Figure 4:
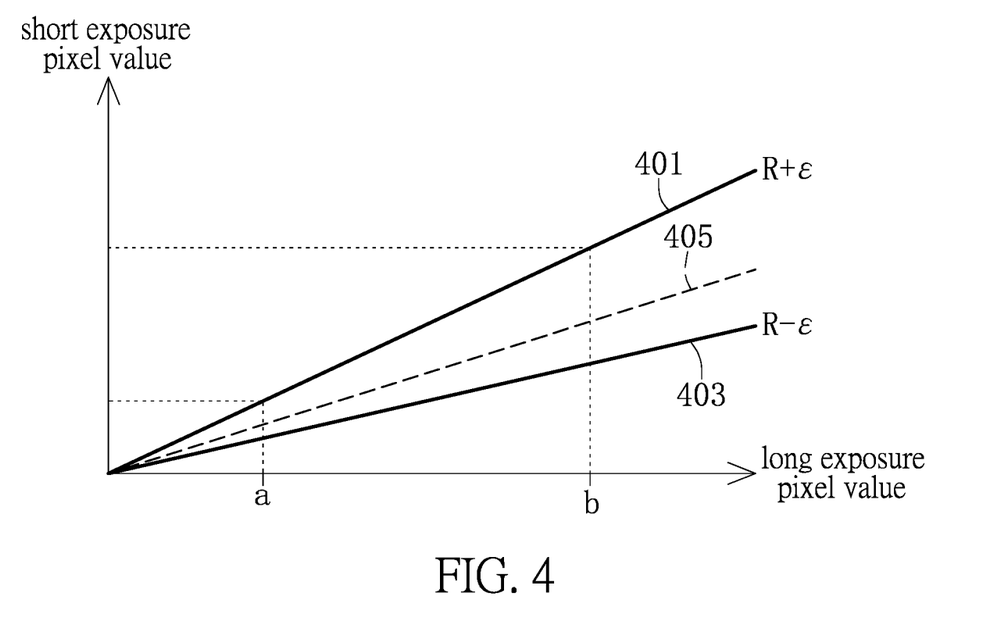
FIG. 4 is an schematic diagram depicting a range having a valid pixel pair.

Reference is made to FIG. 4, which is a schematic diagram depicting a range having a valid pixel pair. In the diagram, pixel values of a long exposure frame and a short exposure frame form an x-y region. The pixel values of the long exposure frame and the short exposure frame are within a range enclosed by four restriction lines. In the exemplary example, the reasonable range is enclosed by a pixel value a, a pixel value b, an upper limit ratio $R_{ISP}+\varepsilon$, and a lower limit ratio $R_{ISP}-\varepsilon$, such that the reference valid pixel pair in the previous frame and the next frame can be obtained. The relevant description is as follows, and reference is made to FIG. 5, which is a flowchart describing a process of obtaining the valid pixel pair in one embodiment of the present disclosure.

Figure 5:
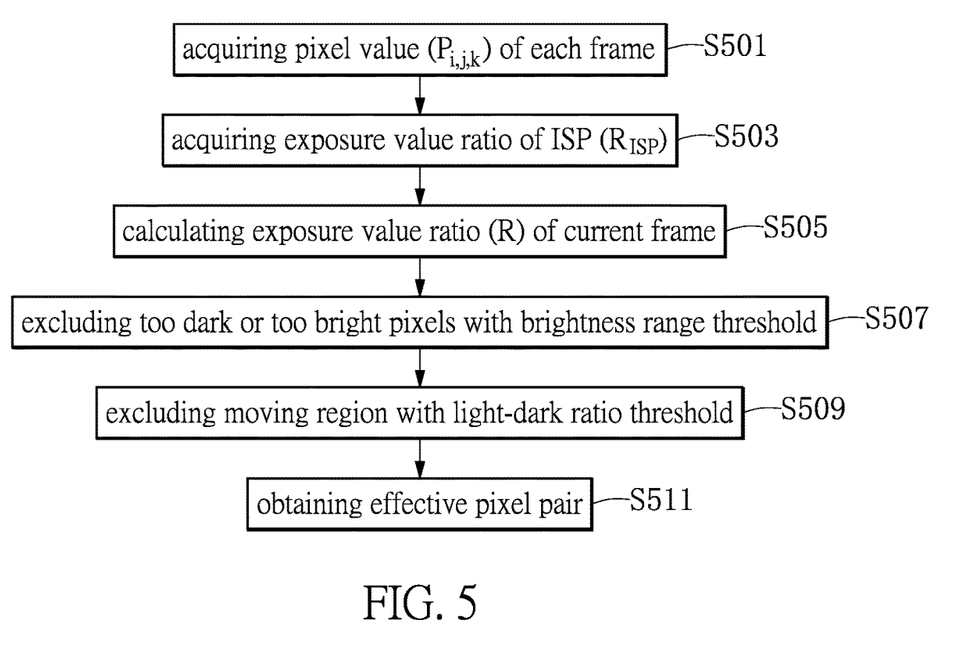
FIG. 5 is a flowchart describing a process of obtaining a valid pixel pair in one embodiment of the present disclosure.

In the process, the pixel values ($P_{i,j,k}$) of the sequential frames in the video are obtained (step S501). The processor exposure value ratio ($R_{ISP}$) of the image signal processor is also obtained (step S503). Next, an instant exposure value ratio (R) of a current frame is calculated (step S505). The brightness range threshold is used to exclude the overly-dark and the overly-bright pixels in each of the frames (step S507). The light-dark ratio threshold is used to exclude the moving region in each of the frames (step S509).

According to one embodiment of the present disclosure, reference is made to FIG. 4, in which a horizontal axis denotes a long exposure pixel value, and a vertical axis denotes a short exposure pixel value. An upper limit ratio 401 and a lower limit ratio 403 are set according to the processor exposure value ratio $R_{ISP}$ of the image signal processor. The upper limit ratio 401 is such as "$R_{ISP}+\varepsilon$", and the lower limit ratio 403 is such as "$R_{ISP}-\varepsilon$" of the present example. The long exposure pixel value, the short exposure pixel value, the upper limit ratio 401, and the lower limit ratio 403 enclose a ratio range covering a reasonable ratio 405. Reference can be further made to the above-mentioned brightness range indicative of an appropriate brightness range. The brightness range is a range enclosed by the pixel values (a) and the pixel values (b) after overexposed pixels and the overly-dark pixels are excluded. Therefore, the valid pixel pair within the reasonable ratio is chosen after the overexposed pixels or the overly-dark pixels are excluded (step S511).

Figure 6:
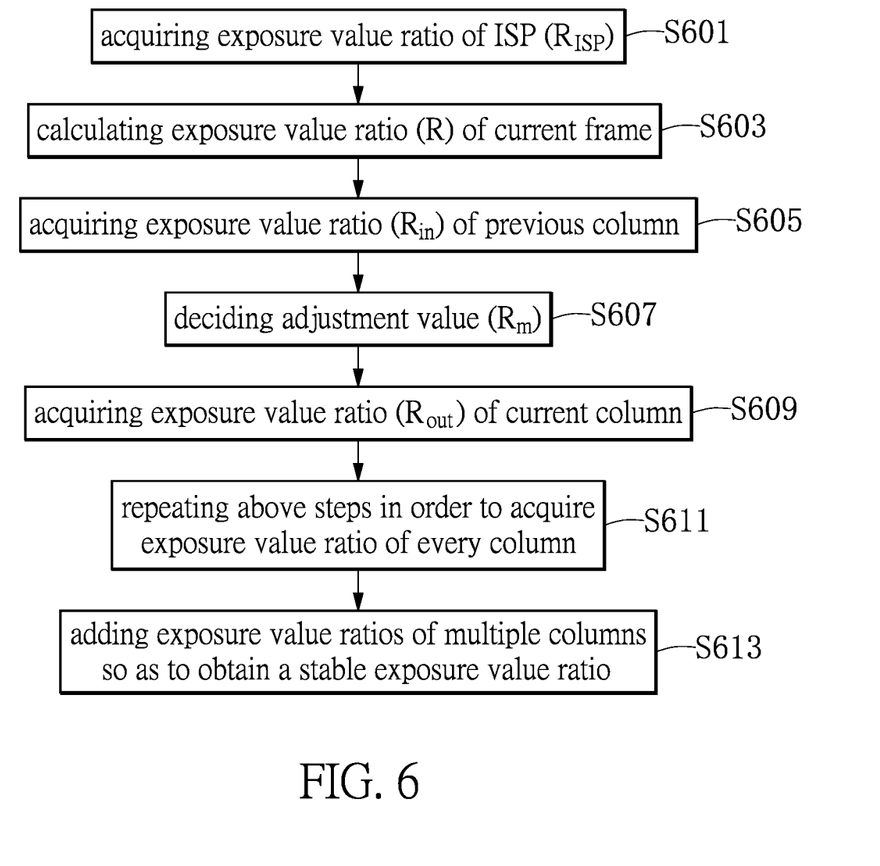
FIG. 6 is a flowchart describing a process of calculating an exposure value ratio in one embodiment of the present disclosure.

Further, in the step S505 of acquiring an instant exposure value ratio R, a calculation for acquiring the instant exposure value ratio for valid pixel pair in each of the frames is performed. Reference is made to FIG. 6, which is a flowchart describing a process of calculating the exposure value ratio in one embodiment of the present disclosure.

In the beginning, a predetermined value of an exposure value ratio can be a processor exposure value ratio ($R_{ISP}$) of an image signal processor (step S601). Similarly, an instant exposure value ratio (R) of the current frame is obtained (step S603). In one embodiment of the present disclosure, in order to maintain continuity of the picture in the video, the exposure compensation can be performed in units of a row. According to a range having the valid pixel pair shown in FIG. 4, rather than a sum of pixel values in a single row, a sum of pixel values of one or more rows until a current row in each of the frames is used for enhancing stability when multiple rows are present. The equation for calculating the instant exposure value ratio R is as follows.

In an exemplary example, when the exposure value ratio for each of the frames is calculated in units of a row of the frames, a previous row exposure value ratio ($R_{in}$) is firstly obtained (step S605). In addition to setting a first row exposure value ratio to be an initial processor exposure value ratio ($R_{ISP}$) inputted to the image signal processor, an instant exposure value ratio for each of the rows equals to a previous row exposure value ratio plus an adjustment value for each of the rows, that can be expressed by an equation "$R_{out}=R_{in}+R_m$", in which "$R_{out}$" indicates the instant exposure value ratio, "$R_{in}$" indicates the previous row exposure value ratio, and "$R_m$" is the adjustment value for each of the rows. Accordingly, the instant exposure value ratio $R_{out}$ can be obtained from the previous row exposure value ratio $R_{in}$. Therefore, the method can determine the adjustment value ($R_m$) in advance (step S607).

The adjustment value $R_m$ can be exemplarily determined by an equation 2.

$R_m=0$, if $-E \leq R-R_{in} \leq E$, in which "$E$" is a threshold for adjusting the ratio;      Equation 2:

$R_m=R_m$, if $R-R_{in}>E$;

$R_m=-R_m$, if $R-R_{in}<-E$.

Therefore, the above steps can be used to calculate an instant exposure value ratio ($R_{out}$) of a current row (step S609). The exposure value ratio for every row can be obtained by repeating the above steps (step S611).

In the process of determining the instant exposure value ratio $R_{out}$, if a frame is initially configured to be that the processor exposure value ratio $R_{ISP}$ of the image signal processor is lower than a practical exposure value ratio $R_s$ of the image sensor, the exposure value ratio ($R_1$) of a first row of the frame is $R_1=R_{ISP}$, and the exposure value ratio ($R_2$) of a second row equals to the processor exposure value ratio ($R_{ISP}$) of the image signal processor plus an adjustment value ($R_m$), namely $R_2=R_{ISP}+R_m$. The exposure value ratios of each of the rows in each frame can also be calculated. According to one embodiment of the present disclosure, a threshold for adjusting the exposure value ratio can be incorporated to converge the exposure value ratio of each of the frames, that is, to calculate the exposure value ratio of each of the rows until the exposure value ratio of a row j satisfies the relationship: $R_j=R_{ISP}+j*R_m>R-E$, in which "R" is an instant exposure value ratio, "E" is the threshold for adjusting the exposure value ratio. Afterwards, the exposure value ratio enters a stable region that can be a ratio range covering the reasonable ratio 405 shown in FIG. 4, at this time, the exposure value ratio for each of the frames of the video is converged. Therefore, the continuity can be guaranteed when change of the exposure value ratio for each of the rows is fixed before the row j, and no abnormality is caused by incorrect exposure value ratio in the following frames because the exposure value ratio is converged.

Afterwards, the multiple converged exposure value ratios of multiple rows are summed up for obtaining the stable exposure value ratio for each frame (step S613).

Figure 7:
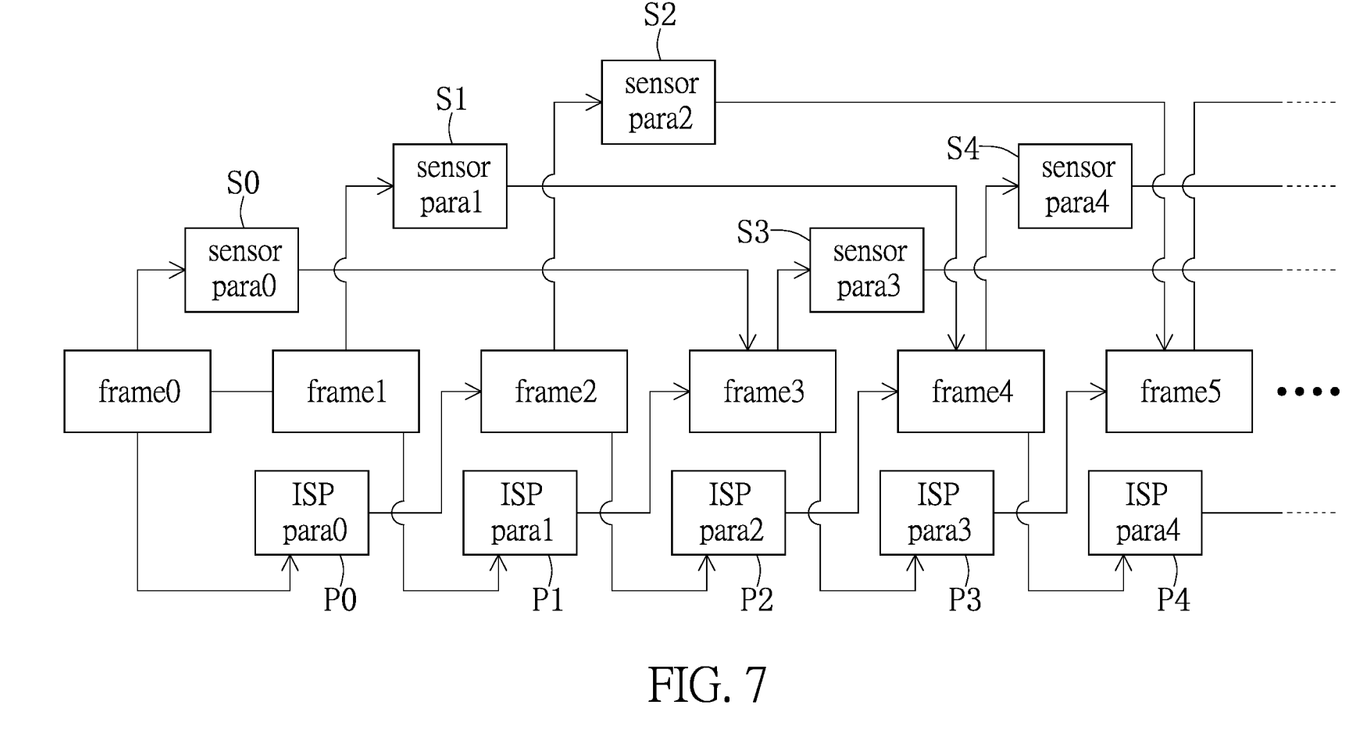
FIG. 7 is a schematic diagram depicting an image signal processor being used to control parameters of an HDR video.

According to the embodiments relating to the abovementioned chosen valid pixel pair and the exposure value ratio between the frames, the method for exposure compensation applied to a high dynamic range video can be implemented, and a circuitry applying the method can be referred to in a circuit block diagram shown in FIG. 1. The circuit as shown in the diagram is configured to be disposed in an image-acquisition device. The circuitry includes a control circuit (such as a controller 18 of FIG. 1) that is used to control operations of an image signal processor and an image sensor of the image-acquisition device. In particular, the method adapted to the circuitry does not use queue control when processing calculation of exposure values in the image signal processor. FIG. 7 further shows an exemplary example of parameter control applied to the image signal processor for rendering the HDR video.

According to the embodiment of the present disclosure, the control circuit controls operations of the circuit components of the image-acquisition device. When the image-acquisition device is powered on, the lens is driven to capture continuous images sensed by the image sensor so as to generate image signals. The image signals are firstly stored in a memory. The image signal processor then processes the image signals. The circuitry embodies an HDR video exposure compensation circuit. The control circuit performs the method for exposure compensation applied to the HDR video upon the images. FIG. 7 schematically shows the continuous images represented by a zeroth frame (frame 0), a first frame (frame 1), a second frame (frame 2), a third frame (frame 3), a fourth frame (frame 4), and a fifth frame (frame 5) that are generated when the image-acquisition device captures images of a specific object. Since the image signal processor does not adapt the manner of queue control, and at least two frames are required to render the HDR video, the image sensor accordingly needs two frames to generate a new exposure value. Therefore, the image sensor parameters that are used to process the sequential frames will take effect after delaying two frames. For example, the zeroth frame (frame 0) image shown in top portion of FIG. 7 is used to generate sensor parameters S0 that take effect at the third frame after delaying two frames. Similarly, the first frame image is used to generate sensor parameters S1 that take effect at the fourth frame, the second frame image is used to generate sensor parameters S2 that take effect at the fifth frame, the third frame is used to generate sensor parameters S3 that take effect at a sixth frame (not shown in this diagram), and the fourth frame is used to generate sensor parameters S4 that take effect at a seventh frame (not shown in this diagram).

According one further embodiment of the method for exposure compensation applied to a high dynamic range video, rather than the conventional method that uses a queue to synchronize the image sensor and the image signal processor, the image signal processor of the present disclosure conducts exposure compensation according to the instant exposure value ratio between a previous frame and a next frame. The relevant embodiment can be referred to in a flowchart shown in FIG. 9.

Figure 9:
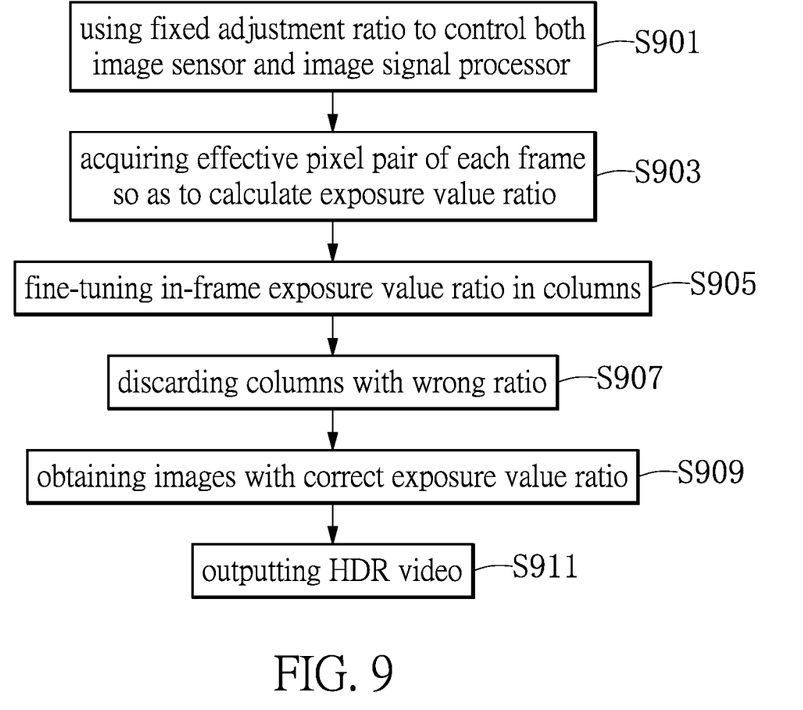
FIG. 9 is a flowchart describing a method for exposure compensation applied to a high dynamic range video according to one embodiment of the present disclosure.

In the method, an initial exposure value ratio is set as the processor exposure value ratio. A fixed adjustment ratio can be used to control both the image sensor and the image signal processor at the same time (step S901). The image data of continuous images can be retrieved from a video. The abovementioned embodiments are referred to so as to obtain a valid pixel pair with respect to each of the frames, and calculate an exposure value ratio in real time. Therefore, the valid pixel pair of each of the frames is acquired so as to calculate an exposure value ratio (step S903). In one of the embodiments of the present disclosure, a predetermined processor exposure value ratio ($R_{ISP}$) of the image signal processor is adapted as the exposure value ratio for the zeroth frame (frame 0). Next, the exposure value ratio between the previous frame and the next frame is referred to for obtaining the fixed adjustment ratio ($R_{adj}$) for each of the frames. The fixed adjustment ratio $R_{adj}$ can be used as a fixed ratio that is used to fine-tune the ratio of each of the frames. Therefore, every frame can be controlled to have the same error for acquiring the exposure value ratio for every frame. Since the continuity of the frames of the video is considered, an in-frame exposure value ratio can be fine-tuned in units of a row (step S905).

With using two frame exposure values to perform a high dynamic range process as an example, when the sequential frames are retrieved from the video a first frame exposure value ratio is used as the processor exposure value ratio ($R_{ISP}$) that multiplies the fixed adjustment ratio ($R_{adj}$), and a second frame exposure value ratio is used as the processor exposure that multiplies twice the fixed adjustment ratio; correspondingly, an initial exposure value ratio that corresponds to the first frame exposure value ratio is set in the image sensor. Next, an error is adjusted to be the same as the fixed adjustment ratio ($R_{adj}$). Therefore, the exposure value ratio corresponding to the second frame exposure value ratio set in the image sensor is a result of the initial exposure value ratio multiplying the fixed adjustment ratio.

For example, starting with a predetermined processor exposure value ratio ($R_{ISP}$), the fixed adjustment ratio $R_{adj}$ is used to adjust the exposure value ratio for each of the frames. The exposure value ratio of a first frame is $R_{ISP}*R_{adj}$. The image sensor has an initial exposure value ratio $R_s$. An error can be adjusted to the fixed adjustment ratio $R_{adj}$. The exposure value ratio of a second frame is $R_{ISP}*R_{adj}*R_{adj}$. The exposure value ratio applied to the image sensor is $R_s*R_{adj}$, and the error is still a multiple of $R_{adj}$. Afterwards, the error sustains until the convergence ends and then the error disappears since the number of error frames of the image signal processor and the image sensor are the same. If the ratio adjustment value for each frame is fixed, then the error for each frame can be fixed without using the processor queue, and the discontinuity in the intersection region during the convergence can be avoided.

Furthermore, a combination of the process of detecting the exposure value ratio and the process of high dynamic range compensation can compensate an error between the compensated picture and an expected exposure value ratio. In the embodiment of exposure compensation that the in-frame exposure value ratio is fine-tuned in units of a row, the speed of convergence and the rows to be affected are determined based on the adjustment value $R_m$ for each of the rows and the fixed adjustment ratio $R_{adj}$.

Table 1 exemplarily shows outputs of the image sensor. The initial exposure value ratio (i.e., the processor exposure value ratio ($R_{ISP}$)) is 4 times. The adjustment value ($R_m$) is 3.125% (1/32). The fixed adjustment ratio ($R_{adj}$) controls the frame requiring 4 rows to be converged progressively if the exposure value ratio of each of the frames raises 12.5% (1/8). According to Table 1, the exposure value ratio error ($E_i$) for each row in each frame changes until $E_5$ through the convergence process.

TABLE 1

| frame | $R_{ISP}$ | $R_m$ | $R_s$ | $E_1$ | $E_2$ | $E_3$ | $E_4$ | $E_5$ | ... |
|---|---|---|---|---|---|---|---|---|---|
| 0 | 4.0 | 0.125 | 4.0 | 1.0 | 1.0 | 1.0 | 1.0 | 1.0 | |
| 1 | 4.5 | 0.141 | 4.0 | 1.125 | 1.090 | 1.054 | 1.019 | 1.0 | |
| 2 | 5.0625 | 0.158 | 4.5 | 1.125 | 1.090 | 1.054 | 1.019 | 1.0 | |
| 3 | 5.695 | 0.178 | 5.0625 | 1.125 | 1.090 | 1.054 | 1.019 | 1.0 | |
| ... | | | | | | | | | |

Table 1 shows a whole process of convergence of the exposure value ratio, in which the exposure value ratio error ($E_i$) for each of the rows is fixed, and the brightness of the pixels in each of the rows can be ensured to change stably during the convergence process when the given fixed adjustment ratio $R_{adj}$ is small enough and the adjustment value $R_m$ for each row is large enough. Therefore, the number of rows to be affected can be limited to a certain number.

Figure 8:
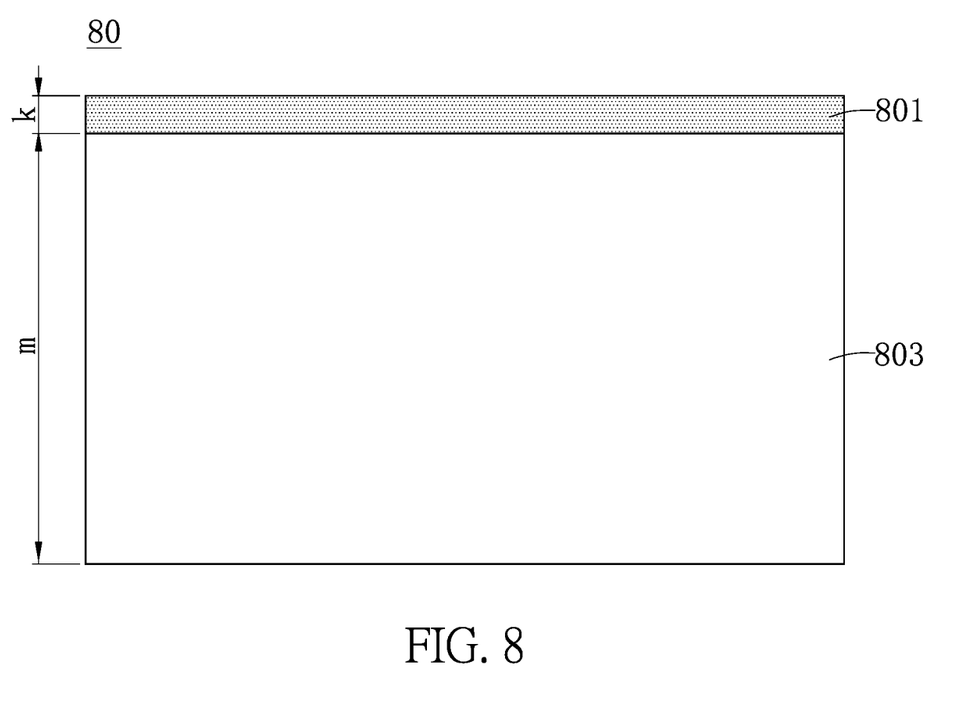
FIG. 8 is a schematic diagram depicting outputting an image that has a removable region.

Further, in one further embodiment of the present disclosure, reference is made to FIG. 8, which is a schematic diagram depicting outputting an image that has a removable region. The image sensor outputs an output image 80. In the method for exposure compensation applied to an HDR video, for using a larger output image having a height k+m, the image sensor can discard the data of several rows. The process in the method starts by being performed on the output image 80 having a removable region 801 with a height k from an initial processor exposure value ratio. The exposure value ratio is converged by an adjustment value $R_m$ of each of the rows and a fixed adjustment ratio $R_{adj}$. The removable region 801 with the height k in every frame can be removed after the convergence process is completed, and the output image region 803 with a height m is taken.

Thus, when the image outputted by the image sensor has a height m+k, the rows with erroneous exposure value ratio (i.e., the removable region 801) are removed so as to form the output image with the height m after the convergence process. Therefore, the rows with the erroneous exposure value ratio, which are configured to be discarded, can be excluded from the process of convergence (step S907). In one further embodiment, the removable region 801 may not need to be removed but can be made less visible to the human eyes via other manners. Finally, the image being compensated with correct exposure value ratio can be obtained (step S909). After that, a series of sequential frames undergone the high dynamic range compensation are obtained, and an HDR video is outputted via an output circuit of the image-acquisition device (step S911).

It should be noted that, in the method for exposure compensation applied to a high dynamic range video, a stability of changes in the whole convergence process can be guaranteed when the fixed adjustment ratio $R_{adj}$ is controlled to be small enough so that the problem of continuity and abnormal composition can be prevented.

In summation, according to the abovementioned embodiments of the method and the circuitry for exposure compensation applied to a high dynamic range video, the exposure compensation method uses an exposure value ratio of a pixel pair in the frames of a video to perform compensation. Therefore, the image sensor and the image signal processor can take effect synchronously. The method does not use the queue that may cause discontinuity to the intersection region of the images in the conventional technology. In one embodiment (but not limited thereto), the exposure value ratio of the image sensor can be updated in units of a row in real time. The exposure compensation can be performed with an instant detected exposure value ratio for guaranteeing the continuity of the compensated exposure between the rows or the frames. Thus, rather than the queue being used for processing the HDR video, the method uses the proposed exposure value ratio to continuously process the HDR video for ensuring the stable convergence process regardless of the difference in the number of the effective frames between the image sensor and the image signal processor. The problems of abnormal composition and flickering phenomenon on the screen can be prevented when implementing the HDR video.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method, comprising:
   retrieving pixel values of pixels in each frame of sequential frames of a video;
   obtaining an instant exposure value ratio, in units of a row of one of the frames, between two frames in succession among the sequential frames by comparing sums of row pixel values of two of the sequential frames;
   acquiring an exposure value ratio for each frame of the sequential frames in real time by using a fixed adjustment ratio to control an image signal processor and an image sensor according to a processor exposure value ratio of the image signal processor, wherein the fixed adjustment ratio is used as a fixed ratio to fine-tune the exposure value ratio for each frame so as to control each frame to have a same error, and the instant exposure value ratio of a first row of one of the frames is used as the processor exposure value ratio to be inputted to the image signal processor; and
   generating sequential frames that undergone a high dynamic range compensation process by exposure compensation that employs the exposure value ratio for each frame of the sequential frames.

2. The method according to claim 1, wherein, in a beginning of the method, a brightness range threshold is set for excluding overly-dark and overly-bright pixels, and a light-dark ratio threshold is set for excluding one or more potential moving regions from the video.

3. The method according to claim 2, wherein, in the method, two frame exposure values are provided in a high dynamic range process; wherein, when the sequential frames are retrieved from the video, a first frame exposure value ratio is used as the processor exposure value ratio that multiplies the fixed adjustment ratio, and a second frame exposure value ratio is used as the processor exposure that multiplies twice the fixed adjustment ratio; correspondingly, an initial exposure value ratio that corresponds to the first frame exposure value ratio is set in the image sensor, [an] the error is adjusted to be the same as the fixed adjustment ratio, and the exposure value ratio corresponding to the second frame exposure value ratio set in the image sensor is a result of the initial exposure value ratio multiplying the fixed adjustment ratio.

4. The method according to claim 2, wherein, when pixel values of two sequential frames are retrieved from the video, a ratio range and an appropriate brightness range are set between the two sequential frames according to the processor exposure value ratio and the brightness range threshold for selecting a valid pixel pair between the two sequential frames within a reasonable ratio after excluding overexposed or overly-dark pixels, and an exposure compensation is performed upon the HDR video with the valid pixel pair between the two sequential frames.

5. The method according to claim 4, wherein the instant exposure value ratio equals to a previous row exposure value ratio plus an adjustment value for each of the rows.

6. The method according to claim 5, wherein, when the exposure value ratio for each row of each of the frames is calculated, a threshold for adjusting the exposure value ratio is used to converge the exposure value ratio for each of the frames.

7. The method according to claim 6, wherein, starting from the processor exposure value ratio initially, the adjustment value of each of the rows and the fixed adjustment ratio are used to converge the exposure value ratio, a removable region with a height in each of the frames is removed after the convergence, and an output image region with another height is taken for outputting the HDR video via an output circuit.

8. A circuitry for exposure compensation applied to a high dynamic range (HDR) video, the circuitry being disposed in an image-acquisition device, comprising:
   a control circuit used to control operations of an image signal processor and an image sensor of the image-acquisition device, performing a method for exposure compensation applied to a high dynamic range video including:
   receiving a video, and retrieving pixel values of each frame of sequential frames of the video;
   obtaining an instant exposure value ratio, in units of a row of one of the frames, between two frames of the sequential frames by comparing sums of row pixel values of two of the sequential frames;
   using a fixed adjustment ratio to control the image signal processor and the image sensor according to a processor exposure value ratio of the image signal processor for acquiring an exposure value ratio for each frame of the sequential frames in real time, wherein the fixed adjustment ratio is used as a fixed ratio to fine-tune the exposure value ratio for each frame so as to control each frame to have a same error, and the instant exposure value ratio of a first row of one of the frames is used as the processor exposure value ratio to be inputted to the image signal processor; and
   using the exposure value ratio for each frame of the sequential frames to perform exposure compensation for generating sequential frames undergone a high dynamic range compensation process so as to output an HDR video.

9. The circuitry according to claim 8, wherein the instant exposure value ratio equals to a previous row exposure value ratio plus an adjustment value for each of the rows.

10. The circuitry according to claim 8, wherein, in a beginning of the method, a brightness range threshold is set for excluding overly-dark and overly-bright pixels, and a light-dark ratio threshold is set for excluding one or more potential moving regions from the video.

11. The circuitry according to claim 10, wherein the instant exposure value ratio equals to a previous row exposure value ratio plus an adjustment value for each of the rows.

12. The circuitry according to claim 10, wherein, when pixel values of two sequential frames are retrieved from the video, a ratio range and an appropriate brightness range are set between the two sequential frames according to the processor exposure value ratio and the brightness range threshold for selecting a valid pixel pair between the two sequential frames within a reasonable ratio after excluding overexposed or overly-dark pixels, and an exposure compensation is performed upon the HDR video with the valid pixel pair between the two sequential frames.

13. The circuitry according to claim 12, wherein the instant exposure value ratio equals to a previous row exposure value ratio plus an adjustment value for each of the rows.

14. The circuitry according to claim 13, wherein, when the exposure value ratio for each row of each of the frame is calculated, a threshold for adjusting the exposure value ratio is used to converge the exposure value ratio for each of the frames.

15. The circuitry according to claim 14, wherein, starting from the processor exposure value ratio initially, the adjustment value of each of the rows and the fixed adjustment ratio are used to converge the exposure value ratio, a removable region with a height in each of the frames is removed after the convergence, and an output image region with another height is taken for outputting the HDR video via an output circuit.

* * * * *